(12) United States Patent
Harikumar et al.

(10) Patent No.: US 8,370,508 B2
(45) Date of Patent: Feb. 5, 2013

(54) METHOD, SYSTEM AND APPARATUS FOR MAIN MEMORY ACCESS SUBSYSTEM USAGE TO DIFFERENT PARTITIONS IN A SOCKET WITH SUB-SOCKET PARTITIONING

(75) Inventors: Ajay Harikumar, Bangalore (IN); Tessil Thomas, Karnataka (IN); Biju Puthur Simon, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1125 days.

(21) Appl. No.: 12/291,306

(22) Filed: Nov. 7, 2008

(65) Prior Publication Data

US 2009/0164751 A1 Jun. 25, 2009

(30) Foreign Application Priority Data

Dec. 20, 2007 (IN) .......................... 2676/DEL/2007

(51) Int. Cl.
*G06F 15/16* (2006.01)
*G06F 15/173* (2006.01)

(52) U.S. Cl. ......... 709/229; 709/226; 709/227; 709/228

(58) Field of Classification Search ........... 709/226–229
See application file for complete search history.

(56) References Cited

U.S. PATENT DOCUMENTS

| | | | |
|---|---|---|---|
| 6,633,967 B1 | 10/2003 | Duncan | |
| 7,260,635 B2* | 8/2007 | Pandya et al. | 709/226 |
| 7,558,271 B2* | 7/2009 | Elliot et al. | 370/395.42 |
| 7,721,148 B2 | 5/2010 | Brenden et al. | |
| 7,725,559 B2* | 5/2010 | Landis et al. | 709/215 |
| 7,853,755 B1 | 12/2010 | Agarwal et al. | |
| 2008/0134191 A1 | 6/2008 | Warrier et al. | |
| 2009/0164730 A1 | 6/2009 | Harikumar et al. | |
| 2009/0164739 A1 | 6/2009 | Harikumar et al. | |
| 2009/0164747 A1 | 6/2009 | Harikumar et al. | |

OTHER PUBLICATIONS

U.S. Patent and Trademark Office, Office Action mailed Jul. 26, 2011, with Reply filed Oct. 19, 2011 in U.S. Appl. No. 12/291,303.

* cited by examiner

*Primary Examiner* — Minh-Chau Nguyen
(74) *Attorney, Agent, or Firm* — Trop, Pruner & Hu, P.C.

(57) ABSTRACT

Embodiments enable sub-socket partitioning that facilitates access among a plurality of partitions to a shared resource. A round robin arbitration policy is to allow each partition, within a socket, that may utilize a different operating system, access to the shared resource based at least in part on whether an assigned bandwidth parameter for each partition is consumed. Embodiments may further include support for virtual channels.

20 Claims, 6 Drawing Sheets

METHOD, SYSTEM AND APPARATUS FOR MAIN MEMORY ACCESS SUBSYSTEM USAGE TO DIFFERENT PARTITIONS IN A SOCKET WITH SUB-SOCKET PARTITIONING

CROSS-REFERENCE TO RELATED APPLICATION

Pursuant to 35 U.S.C. §119, this application claims priority to Indian Application Serial No. 2676/DEL/2007, filed Dec. 20, 2007, the subject matter of which is incorporated herein by reference.

The present application is related to and may incorporate embodiments from three concurrently filed applications by the same set of inventors. The first application, is titled "METHOD, APPARATUS, AND SYSTEM FOR SHARED CACHE USAGE TO DIFFERENT PARTITIONS IN A SOCKET WITH SUB-SOCKET PARTITIONING", Ser. No. 12/291,273, filed concurrently herewith Nov. 7, 2008. The second application, is titled "METHOD, SYSTEM, AND APPARATUS FOR USABILITY MANAGEMENT IN A SYSTEM WITH SUB-SOCKET PARTITIONING", Ser. No. 12/291,272, filed Nov. 7, 2008. The third application, is titled "METHOD, SYSTEM, AND APPARATUS FOR MEMORY ADDRESS MAPPING SCHEME FOR SUB-SOCKET PARTITIONING", Ser. No. 12/291,303, filed Nov. 7, 2008, now U.S. Pat. No. 8,151,081, issued on Apr. 3, 2012.

BACKGROUND

Embodiments of the invention relate to the field of partitioning, and according to one embodiment, a method and apparatus, and system for main memory access subsystem usage to different partitions in a socket with sub-socket partitioning.

As modern microprocessors become increasingly faster with growing number of cores, it becomes feasible from a performance viewpoint to run multiple operating systems on the same hardware. This ability opens up many possibilities including Server consolidation and ability to run services Operating Systems in parallel to the main Operating System. Providing this ability can be done either in software or in hardware. In software it is done using virtualization mechanisms by running a Virtual Machine Monitor (VMM) underneath the Operating Systems. The present partitioning software schemes partition only down to a socket granularity, hence, this precludes partitioning down to a particular core within the processor or socket.

BRIEF DESCRIPTION OF THE DRAWINGS

The invention may best be understood by referring to the following description and accompanying drawings that are used to illustrate embodiments of the invention.

DETAILED DESCRIPTION

Figure 1:
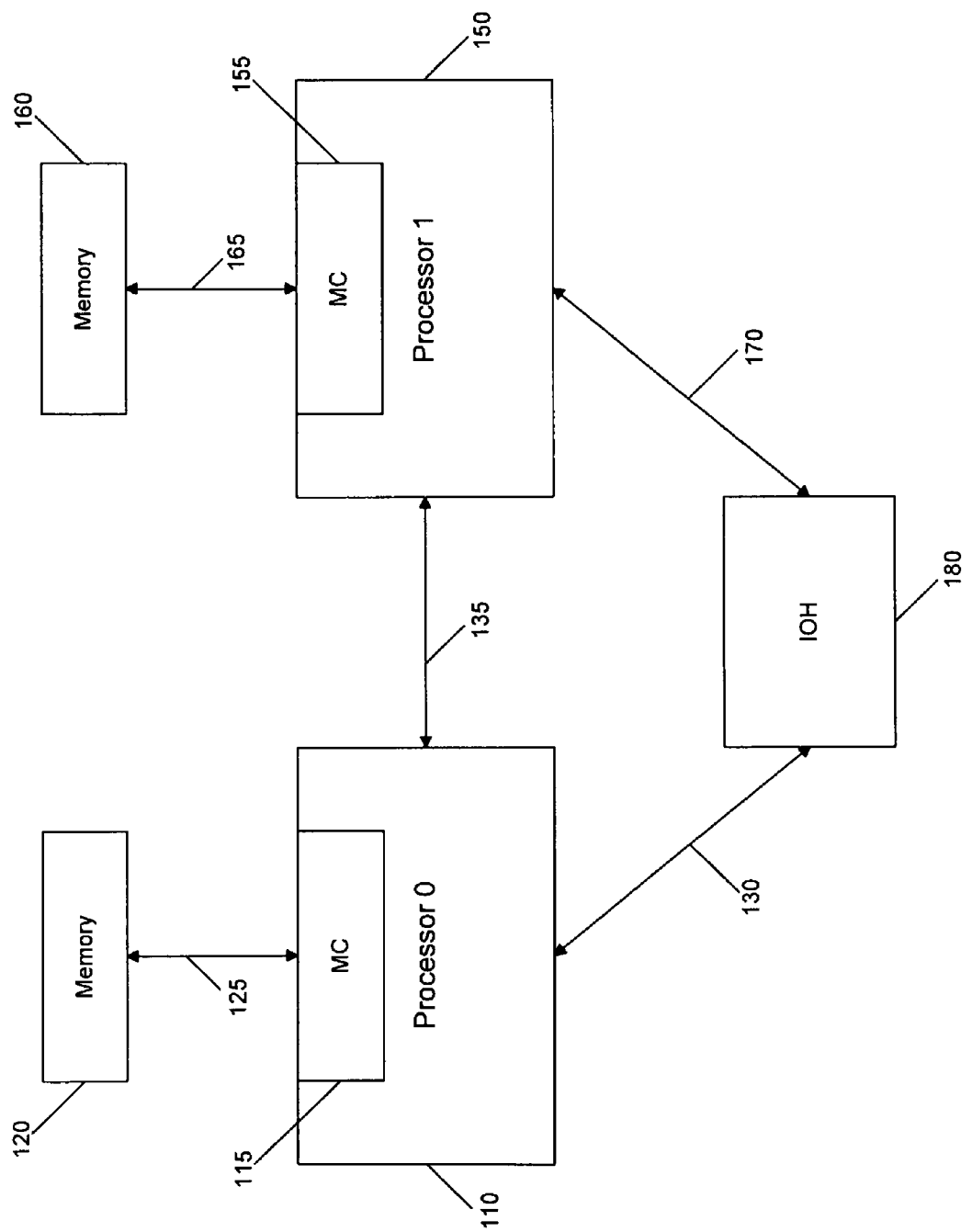
FIG. 1 is an exemplary block diagram of a dual processor system in accordance with an embodiment of the invention.

In one embodiment, at least two different operating systems may operate within each socket, such that, one or more cores are running different operating systems. Hence, "sub-socket partitioning" allows multiple partitions to utilize different operating system within each socket. The claimed subject matter facilitates main memory access subsystem usage to different partitions in a socket with sub-socket partitioning.

In the following description, certain terminology is used to describe features of embodiments of the invention. For example, the term "device" or "agent" is general and may be used to describe any electrical component coupled to a link. A "link or interconnect" is generally defined as an information-carrying medium that establishes a communication pathway for messages, namely information placed in a predetermined format. The link or interconnect may be a wired physical medium (e.g., a bus, one or more electrical wires, trace, cable, etc.) or a wireless medium (e.g., air in combination with wireless signaling technology).

The term "home agent" is broadly defined as a device that provides resources for a caching agent to access memory and, based on requests from the caching agents, can resolve conflicts, maintain ordering and the like. The home agent includes a tracker and data buffer(s) for each caching agent as described below. A "tracker" is dedicated storage for memory requests from a particular device. For instance, a first tracker may include a plurality of entries associated with a first caching agent while a second tracker may include other entries associated with a second caching agent. According to one embodiment of the invention, the "caching agent" is generally a cache controller that is adapted to route memory requests to the home agent.

The term "logic" is generally defined as hardware and/or software that perform one or more operations such as controlling the exchange of messages between devices. When deployed in software, such software may be executable code such as an application, a routine or even one or more instructions. Software may be stored in any type of memory, normally suitable storage medium such as (i) any type of disk including floppy disks, magneto-optical disks and optical disks such as compact disk read-only memories (CD-ROMs), compact disk rewritables (CD-RWs), digital versatile disks (DVDs), (ii) any type of semiconductor devices such as read-only memories (ROMs), random access memories (RAMs), erasable programmable read-only memories (EPROMs), flash memories, electrically erasable programmable read-only memories (EEPROMs), (iii) magnetic or optical cards, or (iv) any other type of media suitable for storing electronic instructions.

In the following description, numerous specific details are set forth. However, it is understood that embodiments of the invention may be practiced without these specific details. In other instances, well-known circuits, structures and techniques have not been shown in detail in order not to obscure the understanding of this description.

Referring to FIG. 1, an exemplary block diagram of a system in accordance with one embodiment of the invention is shown. Herein, FIG. 1 depicts a dual processor (DP) configuration with processors 110 and 150. For instance, this configuration may be associated with a desktop or mobile computer, a server, a set-top box, personal digital assistant (PDA), alphanumeric pager, cellular telephone, or any other type of wired or wireless communication devices.

Each processor 110 and 150 includes a memory controller (MC) 115 and 155 to enable direct communications with an associated memory 120 and 160 via links 125 and 165, respectively. Moreover, the memories 120 and 160 may be independent memories or portions of the same shared memory.

As specifically shown in FIG. 1, processors 110 and 150 are coupled to an input/output hub (IOH) 180 via point-to-point links 130 and 170, respectively. IOH 180 provides connectivity between processors 110 and 150 and input/output (I/O) devices implemented within DP system 100. In addition, processors 110 and 150 are coupled to each other via a point-to-point link 135. According to one embodiment of the invention, these point-to-point links 130, 135, 170 may be adapted to operate in accordance with "Quickpath" specification developed by Intel Corporation of Santa Clara, Calif. However, the claimed subject matter is not limited to a Quickpath link and may utilize any type of link or interconnect. One skilled in the art appreciates the utilization of any link or interconnect scheme that is customized for the particular design requirements. For example, one may use any coherent or non coherent link or interconnect protocol, such as, but not limited to Peripheral Component Interconnect (PCI, PCIe, etc.), a front side bus (FSB), etc.

Figure 2:
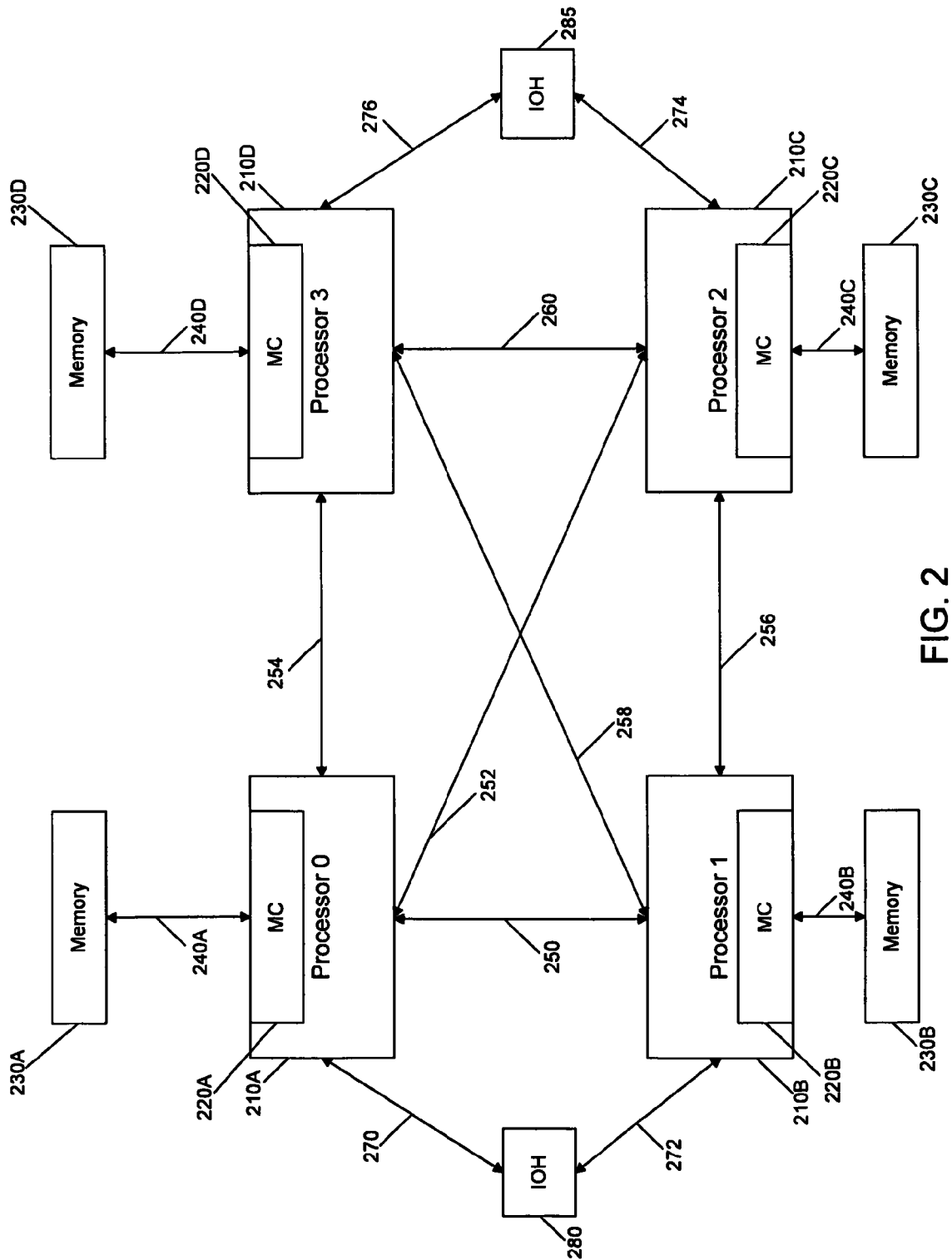
FIG. 2 is an exemplary block diagram of a multi-processor system in accordance with an embodiment of the invention.

Referring now to FIG. 2, an exemplary block diagram of a multiprocessor (MP) system in accordance with one embodiment of the invention is shown. Similarly, MP system may be a desktop or mobile computer, a server, a set-top box, personal digital assistant (PDA), alphanumeric pager, cellular telephone, or any other type of wired or wireless communication devices.

Herein, according to one embodiment of the invention, MP system comprises a plurality of processors 210A-210D. One or more of processors, such as processors 210A-210D, may include a memory controller (MC) 220A-220D. These memory controllers 220A-220D enable direct communications with associated memories 230A-230D via links 240A-240D, respectively. In particular, as shown in FIG. 2, processor 210A is coupled to memory 230A via a link 240A while processors 210B-210D are coupled to corresponding memories 230B-230D via links 240B-240D, respectively.

Additionally, processor 210A is coupled to each of the other processors 210B-210D via pTp (point-to-point) links 250, 252 and 254. Similarly, processor 210B is coupled to processors 210A, 210C and 210D via pTp links 250, 256 and 258. Processor 210C is coupled to processors 210A, 210B and 210D via pTp links 252, 256 and 260. Processor 210D is coupled to processors 210A, 210B and 210C via pTp links 254, 258 and 260. Processors 210A and 210B are coupled via pTp interconnects 270 and 272 to a first input/output hub (IOH) 280 while processors 210C and 210D are coupled via point-to-point interconnects 274 and 276 to a second IOH 285.

For both systems 100 and 200 described in FIGS. 1 and 2, it is contemplated that the processors may be adapted to operate as a home agent, a caching agent or both, depending on the system architecture selected.

Figure 3:
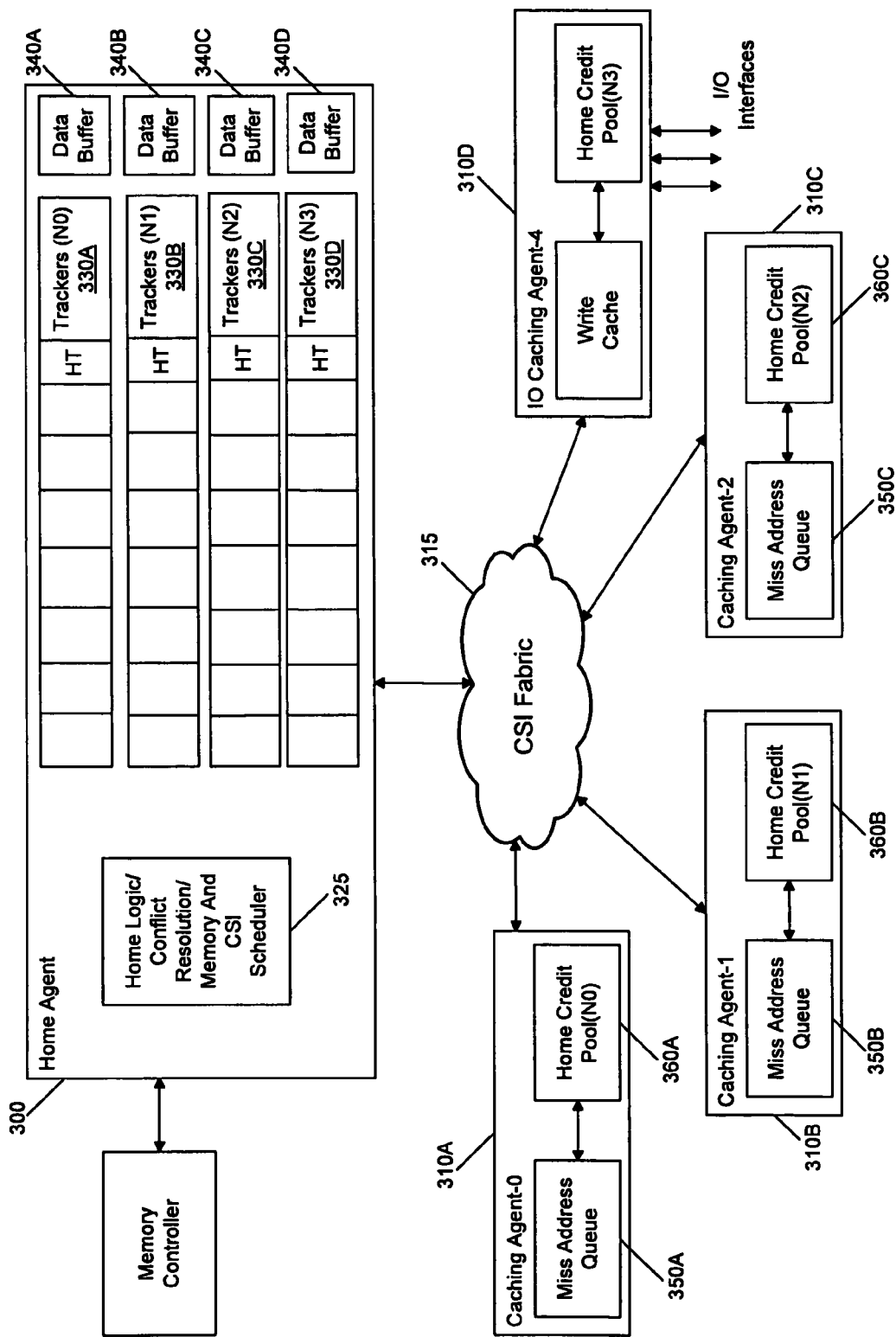
FIG. 3 is an exemplary embodiment of architectures for home and caching agents of the systems of FIGS. 1-2 in accordance with an embodiment of the invention.

Referring now to FIG. 3, an exemplary embodiment of architectures for destination and source devices of the systems of FIGS. 1-2 in accordance with an embodiment of the invention is shown. For illustrative purposes, processor 210D from FIG. 2 (or processor 150 from FIG. 1) is configured as a destination device 300, such as a home agent for example. Processors 210A-210C from FIG. 2 (or processor 110 from FIG. 1) could be configured as sources 310A-310C, such as caching agents for example. IOH 280 or 285 (or IOH 180 of FIG. 1) may be configured as I/O device 310D implementing a write cache 320 operates as a caching agent as well.

As described below, each source 310A, . . . , or 310D is associated with a tracker that is maintained at destination device 300 and has a predetermined number of tracker entries. The number of tracker entries is limited in size to the number of requests that may be transmitted by any source 310A, . . . , or 310D that saturates the bandwidth of a PTP fabric 315, which supports point-to-point communications between destination 300 and the plurality of sources (e.g., sources 310A-310D).

As shown in FIG. 3, according to this embodiment of the invention, destination 300 is a home agent that comprises home logic 325 and a plurality of trackers 3301 . . . 330M, where $M \geq 1$. In combination with trackers 3301 . . . 330M, home logic 325 is adapted to operate as a scheduler to assist in the data transfer of incoming information from memory 230A of FIG. 2 and outgoing information to PTP fabric 315. Moreover, home logic 325 operates to resolve conflicts between these data transfers.

Herein, for this embodiment of the invention, since four (4) caching agents 310A-310D are implemented within system 100/200, four (M=4) trackers are illustrated and labeled "HT-0" 330A, "HT-1" 330B, "HT-2" 330C and "HT-3" 330D. These trackers 330A-330D each contain N0, N1, N2 and N3 tracker entries respectively, where $Ni \geq 1$ (i=1,2,3 or 4). The number of entries (N0-N3) may differ from one tracker to another. Associated with each entry of trackers 330A-330D is a corresponding data buffer represented by data buffers 340A-340D. Data buffers 340A-340D provide temporary storage for data returned from memory controller 220A, and eventually scheduled onto PTP fabric 315 for transmission to a targeted destination. The activation and deactivation of the entries for trackers 330A-330D is controlled by home logic 325 described below.

Caching agents 310A, 310B, and 310C include a miss address queue 350A, 350B, and 350C, respectively. For instance, with respect to caching agent 310A, miss address queue 350A is configured to store all of the miss transactions that are handled by home agent 300.

In addition, according to this embodiment of the invention, caching agents 310A, 310B and 310C further include a credit counter 360A, 360B and 360C, respectively. Each credit counter 360A, 360B, and 360C maintains a count value representative of the number of unused tracker entries in trackers 330A, 330B, and 330C. For instance, when a new transaction is issued by caching agent 310A to home agent 300, credit counter 360A is decremented. If a transaction completes, then credit counter 360A is incremented. At reset time, credit counter 360A is initialized to the pool size equal to the number of tracker entries (N0) associated with tracker 330A. The same configuration is applicable to credit counters 360B-360C.

Also shown in FIG. 3 is an example of caching agent 310D operating as an I/O agent that reads information from memory and writes information to an I/O interface. Alternately, caching agent 310D may stream I/O agent read returns as writes into the main memory. Caching agent 310D implements write cache 320, which is used to sustain high bandwidth while storing data associated with I/O operations.

Figure 4:
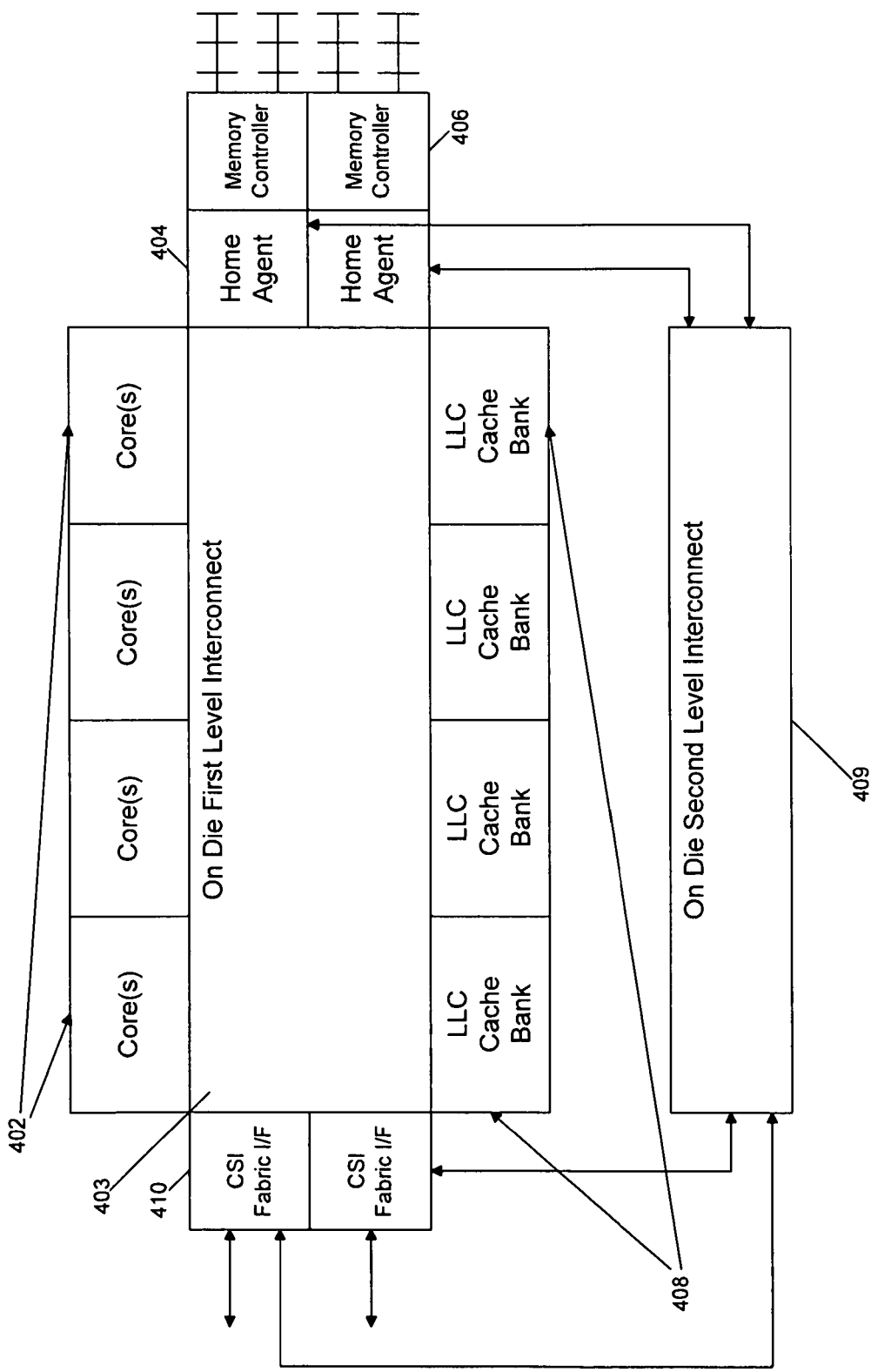
FIG. 4 is a socket architecture in accordance with an embodiment of the invention.

FIG. 4 is a socket architecture in accordance with an embodiment of the invention. In one embodiment, a dual processor system as depicted in the previous figures with each processor socket having processor cores 402. In one embodiment, at least two different operating systems may operate within each socket, such that, one or more cores are running different operating systems. In this embodiment, a partition identifier is assigned to each partition. The cores and the distributed LLC (Last Level Cache banks) 408 are connected to each other within the socket by a first level interconnect 403. In one embodiment, the first level interconnect 403 is an on-die ring interconnect. In anther embodiment, the first level interconnect is a two dimensional mesh/cross bar. The memory controller 406 is integrated into the processor die and a pTp protocol is used for inter-processor communication and IO access. The fabric interfaces 410 and the home agent 404 are also connected to the first level interconnect. The home agents 404 and the fabric interfaces 410 are connected to each other via a second level interconnect 409. In summary, in one embodiment, the first level interconnect may be used to connect the cache memory, home agents and the off chip links to the processor cores, and the second level interconnects are used for connecting the home agent directly to the off chip links. However, the claimed subject matter is not limited to the previous configuration. One skilled in the art appreciates utilizing different configurations to facilitate communication for a particular application or power management scheme.

Figure 5:
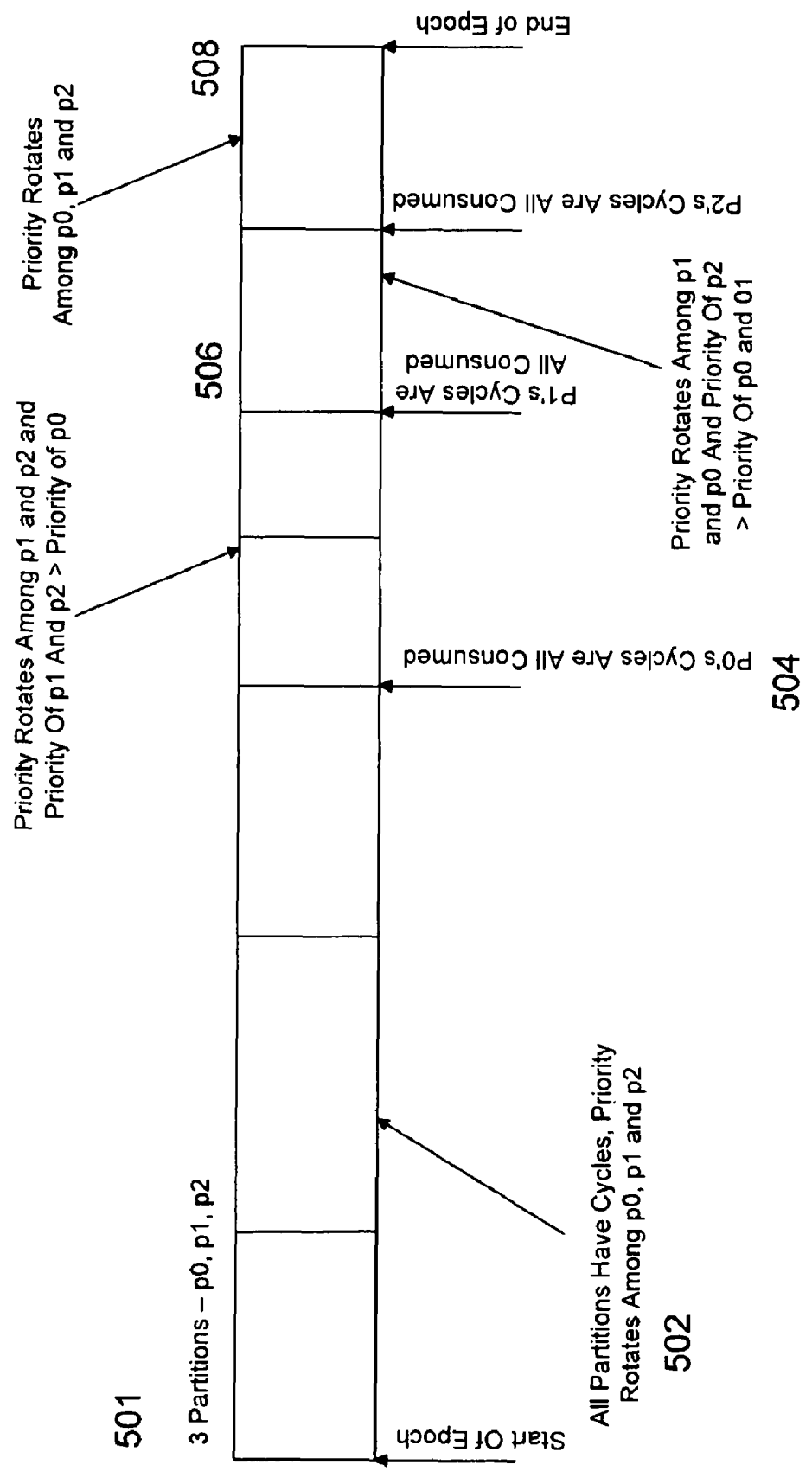
FIG. 5 is a method for a partition flow for a time period in accordance with an embodiment of the invention.

FIG. 5 is a method for a partition flow for a time period in accordance with an embodiment of the invention. In one embodiment, an epoch signifies a time which is chosen as a new origin for time measurements. In one embodiment, at least two different operating systems may operate within each socket, such that, one or more cores are running different operating systems. Hence, "sub-socket partitioning" allows multiple partitions to run a different operating system within each socket. The claimed subject matter facilitates main memory access subsystem usage to different partitions in a socket with sub-socket partitioning.

In one embodiment, information from each partition is metered and depending on the bandwidth consumed and bandwidth allocated for each partition, arbitration priority will be switched between partitions. In this embodiment, time is divided into epochs and each partition is allocated a certain number of cycles of access to the shared resource in each epoch. In this embodiment, the priority among partitions during arbitration keeps changing in a round robin fashion as long as each partition still has allocated cycles left in the epoch. Once a partition has used up its allocated cycles, it will have lower priority in arbitration than those which have not yet used up their allocated cycles. The priority among partitions that still have allocated cycles left will keep changing in a round robin fashion. The priority among partitions that have used up their allocated cycles also will keep changing in a round robin fashion. Therefore, a measurable parameter could be the allocated cycles. Consequently, the allocated cycle service parameter defines the bandwidth allocated to each partition.

In summary, for the partitions that have used up their allocated cycles, and there are requests from multiple partitions pending, higher priority will be given to those who still have allocated cycles left. If everyone has used up their allocated cycles, then the priority among them keeps changing in a round robin fashion as in anti-starvation policy. In one embodiment, a shared resource like a home agent or an off-chip port will have an epoch counter, per partition allocated cycle configuration register, and per partition consumed cycles counter. The specifics of the architecture are depicted in connection with FIG. 6.

However, the claimed subject matter is not limited to a home agent or off-chip port. For example, one skilled in the art appreciates utilizing the claimed subject matter in different portions of a system. In one embodiment, the claimed subject matter may be incorporated in an interface to external cores or chips for off chip access. Also, it may also be incorporated into a cache or last level cache bank control for last level cache accesses. In another embodiment, the claimed subject matter may be incorporated into a home agent for local socket memory accesses. In yet another embodiment, the claimed subject matter may be incorporated in all three of the preceding locations, such as, but not limited to an interface to external cores or chips for off chip access, a cache or last level cache bank control for last level cache accesses, and a home agent for local socket memory accesses.

In one embodiment, all counters will be cleared at the start of a new epoch. The epoch counter starts running as soon as it is enabled via a configuration register write and will be free running as long as enabled. The fairness policies are configured by firmware and can be reconfigured without a reboot by quiescing the system, reprogramming and then dequiescing the system.

The example depicted in FIG. 5 is for three different partitions, p0, p1, and p2. However, the claimed subject matter is not limited to three partitions. This merely depicts one example and one skilled in the art appreciates utilizing different numbers of partitions and different rotation of priority among the partitions.

Reading the time flow diagram for a epoch from left to right, starting with label 501, depicts the three different partitions, p0, p1, and p2. As discussed earlier, the three partitions may be running different operating systems within a socket. For example, p0 and p2 may be running one type of operating system while p1 is running another type of operating system. In another embodiment, all three partitions may be running the same operating system. In yet another embodiment, each partition is running a different partition. However, the claimed subject matter is not limited to three partitions. This merely depicts one example and one skilled in the art appreciates utilizing different numbers of partitions and different rotation of priority among the partitions.

Each partition is allocated a number of cycles and the arbitration priority is rotated among all three partitions in a round robin fashion during label 502. However, at label 504, partition p0 cycles have been consumed. Consequently, arbitration priority is rotated among partitions p1 and p2 while the priority of p1 and p2 are both greater than p0. This trend continues for all the partitions until they have all consumed their allocated cycles. Subsequently, the arbitration priority rotates equally between the partitions for label 508.

Figure 6:
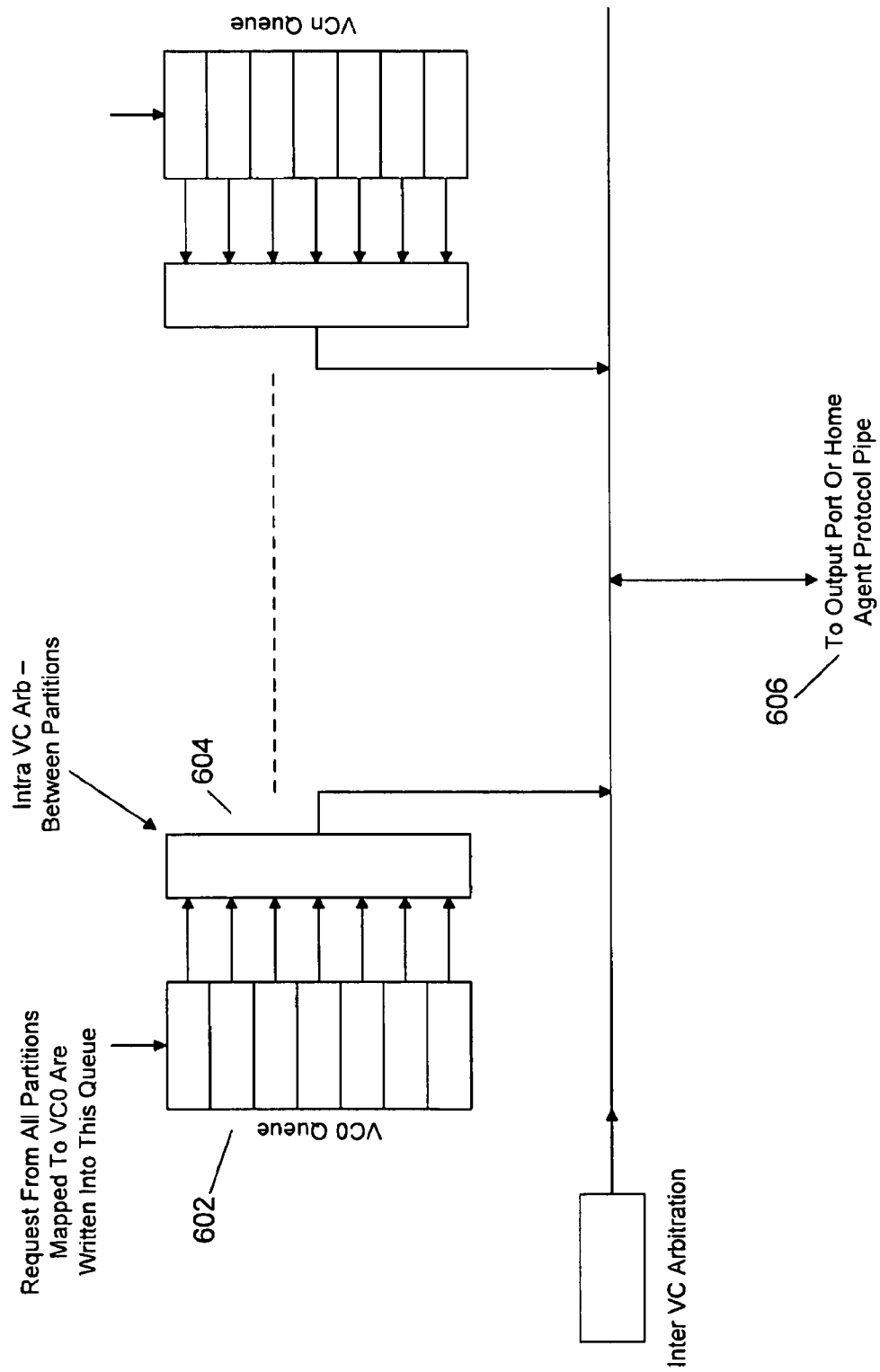
FIG. 6 is a block diagram in accordance with an embodiment of the invention.

FIG. 6 is a block diagram in accordance with an embodiment of the invention. In the point to point interface fabric (label 410 in FIG. 4) for each Virtual channel (VC) a queue 602 is used to sink the requests from all the caching agents on the on die first level interconnect (label 403 in FIG. 4). This queue is then part of the global arbitration for the outgoing output port or home agent protocol pipe 606. Each virtual channel has an epoch counter and the epoch counter is incremented whenever this VC is scheduled for sending a packet. Every caching agent will have an equal number of entries in the VC queue. Each partition will have its own consumed cycles counter and max cycles allocated configuration register for each VC.

The consumed cycles counter is incremented each time a packet belonging to that partition is send out. Based on the consumed cycles counter and max cycles allocated configuration register of each partition, arbitration priority among various partitions is decided. Likewise, based on this priority, the oldest entry belonging to the highest priority partition is selected from the VC queue for transmission. For a Virtual channel with per address ordering requirement, this ordering is maintained by the address field of all the entries in the queue with the address before making a new entry into the queue, if there is a match, then the new entry will be blocked till the older entry to the same address is sent out. This is valid across partitions.

In the home agent, a similar mechanism of queue for each virtual channel and associated request scheduling logic is adopted for fairness between partitions in gaining access to the home protocol processing pipe line.

In the LLC bank (408 from FIG. 4), fairness in access to the caching agent structures which are used for sending requests on to the CSI fabric (410 from FIG. 4) or to the home agent and access to the LLC hit/miss look up pipe is ensured by having a single request queue with equal number of entries for all processors that share the LLC bank. This queue will have an epoch counter. The epoch counter is incremented each time a request is send to the LLC lookup pipe. Each partition will have its own consumed cycles counter and max cycles allocated configuration register. Each time a request belonging to a particular partition is selected, the consumed cycles counter is incremented. Based on the consumed cycles counter and maximum cycles allocated configuration register of each partition, arbitration priority among various partitions is decided.

In the home agent and the LLC bank controller case, in addition to the requests from the local socket partitions, there will be requests from remote sockets. Priority will keep rotating between local socket and remote socket accesses and the epoch counter based mechanism is not used for arbitration decision.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a hardware processor;
    a dynamic random access memory, coupled to the hardware processor, to receive requests from the hardware processor;
    the hardware processor to support sub-socket partitioning to utilize at least a first and a second operating system within a first partition and a second partition of the hardware processor;
    a shared resource, coupled to the hardware processor, with:
        a first hardware counter to define a time period;
        a hardware register, coupled to the first hardware counter, to store a bandwidth parameter for the first partition and the second partition; and
        a second hardware counter, for each partition, coupled to the first hardware counter, to track a number of consumed cycles for each request from the corresponding partition that is used for access to the shared resource during the defined time period.

2. The system of claim 1 wherein the shared resource is a home agent.

3. The system of claim 2 wherein the home agent is a cache controller.

4. The system of claim 1 wherein the bandwidth parameter is a number of allocated cycles for each partition.

5. The system of claim 1 wherein the bandwidth parameter is utilized during the defined time period stored in the first hardware counter.

6. The system of claim 1, wherein the hardware processor comprises a plurality of cores including a first core to run a first operating system and a second core to run a second operating system.

7. The system of claim 1, further comprising a processor socket comprising the hardware processor and including a first plurality of cores to run a first operating system and at least one core to run a second operating system.

8. An agent comprising:
    a first hardware counter to define a time period for both a first partition and a second partition of a processor socket;
    a hardware register, coupled to the first hardware counter, to store a bandwidth parameter for both the first partition and the second partition;
    a second hardware counter, coupled to the first hardware counter, to track a number of consumed cycles for the first partition used for access to the agent during the defined time period; and
    a third hardware counter, coupled to the first counter, to track a number of consumed cycles for the second partition used for access to the agent during the defined time period.

9. The agent of claim 8 wherein the agent is a home agent.

10. The agent of claim 9 wherein the home agent is a cache controller.

11. The agent of claim 8 wherein the bandwidth parameter is a number of allocated cycles for each partition.

12. The agent of claim 8 wherein the bandwidth parameter is utilized during the defined time period stored in the first hardware counter.

13. A processor comprising:
    a plurality of processor cores that support sub-socket partitioning such that each one of the plurality of processor cores can utilize a different operating system;
    an interface, coupled to the plurality of processor cores, to generate and transmit a packet to a plurality of agents coupled to the plurality of processor cores via the interface;
    a hardware transmit logic, integrated within the interface, with:
        a queue for each virtual channel supported by the interface to store all requests for each partition associated with the processor; and
        a hardware counter, coupled to the queue, to be incremented when the virtual channel transmits the packet.

14. The processor of claim 13 wherein the interface is to transmit the packet based at least in part on a round robin arbitration policy that rotates arbitration priority among partitions of the plurality of partitions having a non-zero bandwidth parameter, and rotates the arbitration priority among all of the plurality of partitions if all of the plurality of partitions have a zero bandwidth parameter.

15. The processor of claim 14 wherein the bandwidth parameter is a number of allocated cycles consumed for transmission of the packet to a shared resource.

16. The processor of claim 13 further comprising a plurality of last level cache banks.

17. A method comprising:
    allocating a bandwidth parameter for each of a plurality of partitions in a processor socket for a defined time period, the bandwidth parameter corresponding to a number of allocated cycles consumed for a shared resource for a request from the corresponding partition;
    decrementing the bandwidth parameter for each partition for each completed request from the corresponding partition during the defined time period; and
    rotating arbitration priority during the defined time period among partitions of the plurality of partitions having a non-zero bandwidth parameter, otherwise rotating the arbitration priority during the defined time period among all of the plurality of partitions if all of the plurality of partitions have a zero bandwidth parameter.

18. The method of claim 17 wherein the bandwidth parameter is stored in the register in a shared resource for each partition.

19. The method of claim 17 wherein the number of allocated cycles consumed is tracked in a consumed cycles counter in the shared resource for each partition.

20. The method of claim 17 wherein the defined time period is tracked with an epoch counter in the shared resource for each partition.

* * * * *